(12) United States Patent
Lau et al.

(10) Patent No.: US 12,469,406 B2
(45) Date of Patent: Nov. 11, 2025

(54) METALLIZED BREATHABLE COMPOSITE FABRIC

(71) Applicant: YiLab Temperature Control Technologies (Changzhou) Co., Ltd., Shanghai (CN)

(72) Inventors: Cindy Yee Cin Lau, Palo Alto, CA (US); Pei Zhu, Santa Clara, CA (US)

(73) Assignee: YiLab Temperature Control Technologies (Changzhou) Co., Ltd., Shanghai (CN)

(*) Notice: Subject to any disclaimer, the term of this patent is extended or adjusted under 35 U.S.C. 154(b) by 652 days.

(21) Appl. No.: 17/827,591

(22) Filed: May 27, 2022

(65) Prior Publication Data

US 2022/0324212 A1     Oct. 13, 2022

Related U.S. Application Data

(63) Continuation of application No. PCT/US2020/061762, filed on Nov. 23, 2020.
(Continued)

(51) Int. Cl.
*B32B 5/02*     (2006.01)
*B32B 7/12*     (2006.01)
(Continued)

(52) U.S. Cl.
CPC .............. *G09B 19/06* (2013.01); *B32B 5/02* (2013.01); *B32B 7/12* (2013.01); *B32B 15/08* (2013.01); *B32B 27/06* (2013.01); *B32B 27/12* (2013.01); *B32B 27/18* (2013.01); *B32B 27/40* (2013.01); *G06F 3/0482* (2013.01); *G06T 7/11* (2017.01); *B32B 2264/105* (2013.01); *B32B 2264/30* (2020.08); *B32B 2305/18* (2013.01); *B32B 2307/724* (2013.01); *B32B 2437/00* (2013.01); *G06T 2200/24* (2013.01); *G09B 19/08* (2013.01)

(58) Field of Classification Search
None
See application file for complete search history.

(56) References Cited

U.S. PATENT DOCUMENTS

| 5,750,242 A | 5/1998 | Culler |
|---|---|---|
| 10,138,653 B1 | 11/2018 | Weber |

(Continued)

FOREIGN PATENT DOCUMENTS

| CN | 1179750 A | 4/1998 |
|---|---|---|
| CN | 106142755 A | 11/2016 |

(Continued)

OTHER PUBLICATIONS

International Search and Written Opinion for PCT/US2020/061762 dated Mar. 2, 2021, 15 pages.

*Primary Examiner* — Arti Singh-Pandey
(74) *Attorney, Agent, or Firm* — Sheppard, Mullin, Richter & Hampton LLP; Xin Xie

(57) ABSTRACT

A fabric includes an inner layer, a metallized membrane disposed on the inner layer, and an outer layer disposed on the metallized membrane. The metallized membrane includes a base layer containing a polymer and a metal layer deposited on a first surface of the base layer. The inner layer is coupled to the metallized membrane via first point contacts, and the outer layer is coupled to the metallized membrane via second point contacts.

11 Claims, 4 Drawing Sheets

Related U.S. Application Data

(60) Provisional application No. 62/941,555, filed on Nov. 27, 2019.

(51) Int. Cl.
  *B32B 15/08* (2006.01)
  *B32B 27/06* (2006.01)
  *B32B 27/12* (2006.01)
  *B32B 27/18* (2006.01)
  *B32B 27/40* (2006.01)
  *G06F 3/0482* (2013.01)
  *G06T 7/11* (2017.01)
  *G09B 19/06* (2006.01)
  *G09B 19/08* (2006.01)

(56) References Cited

U.S. PATENT DOCUMENTS

| | | | |
|---|---|---|---|
| 2005/0014432 A1* | 1/2005 | Jain | B32B 27/286 442/79 |
| 2006/0099431 A1 | 5/2006 | Scholz | |
| 2008/0108263 A1* | 5/2008 | Conley | D04H 1/728 442/76 |
| 2008/0187740 A1 | 8/2008 | Bletsos et al. | |
| 2009/0214852 A1 | 8/2009 | Kelsey et al. | |
| 2013/0212789 A1* | 8/2013 | Conolly | B32B 27/12 428/221 |
| 2014/0036355 A1 | 2/2014 | Scholz | |
| 2014/0205798 A1 | 7/2014 | Williams et al. | |
| 2014/0242355 A1 | 8/2014 | Castille | |
| 2016/0320161 A1 | 11/2016 | Castille | |
| 2016/0331054 A1 | 11/2016 | Coza et al. | |
| 2017/0182733 A1 | 6/2017 | Orologio | |
| 2019/0008217 A1 | 1/2019 | Cui et al. | |

FOREIGN PATENT DOCUMENTS

| | | |
|---|---|---|
| CN | 108778012 A | 11/2018 |
| EP | 1096604 B1 | 3/2006 |
| JP | 2008-546042 A | 12/2008 |
| WO | 2019220434 A1 | 11/2019 |

\* cited by examiner

METALLIZED BREATHABLE COMPOSITE FABRIC

CROSS-REFERENCE TO RELATED APPLICATION

This application is a continuation of International Application No. PCT/US2020/061762, filed Nov. 23, 2020, which claims the benefit under 35 U.S.C. 119(e) of U.S. Provisional Application No. 62/941,555, filed Nov. 27, 2019, the content of each of which is hereby incorporated in its entirety.

TECHNICAL FIELD

This disclosure is generally related to fabric for apparels, footwears, tents, and sleeping bags, and more specifically to metallized breathable composite fabrics for apparels, footwears, tents, and sleeping bags.

BACKGROUND

Moisture vapor- and air-permeable metallized polyethylene plexifilamentary film-fibril sheets have been used as house wraps to increase insulation of buildings. However, those sheets are not suitable for garment due to poor hand feel, poor resistance to creases, and poor durability for washing.

SUMMARY

Described herein are breathable composite fabrics for use in apparels, footwears, tents, and sleeping bags that are comfortable to human use and durable to wash cycles.

In one aspect, a laminated fabric includes an inner layer, a metallized membrane disposed on the inner layer, and an outer layer disposed on the metallized membrane. The metallized membrane includes a base layer containing a polymer and a metal layer deposited on a first surface of the base layer. The inner layer is coupled to the metallized membrane via first point contacts, and the outer layer is coupled to the metallized membrane via second point contacts.

In some embodiments, the inner layer is coupled to a second surface of the base layer. The second surface is opposite to the first surface of the base layer. In some embodiments, the outer layer is coupled to a surface of the metal layer.

In some embodiments, each of the inner layer, the base layer, the metal layer, and the outer layer has a moisture vapor transmission rate (MVTR) of at least 500 $g/m^2/24$ hr. In some embodiments, the inner layer has a thermal conductivity at most 0.6 W/m-K. The inner layer may include one of a woven fabric, a knit fabric, or a non-woven fabric. The inner layer may include a synthetic material or a natural material. In some embodiments, the synthetic material is selected from one or more of polyester, nylon, elastane, polyurethane, polyethylene, polypropylene, polylactic acid, or polytetrafluoroethylene (PTFE).

In some embodiments, the fabric has a moisture vapor transmission rate at least 70% of each of the inner layer, the metallized membrane, and the outer layer. In some embodiments, the first and second point contacts are configured in a dot matrix. In some embodiments, the first and second point contacts include an adhesive. In some embodiments, the first point contacts include melted base layer or melted inner layer. In some embodiments, the second point contacts include melted base layer or melted outer layer. In some embodiments, the first point contacts or the second point contacts are formed by sewing or quilting.

In some embodiments, the metal layer includes one or more of aluminum, titanium, silver, gold, copper, zinc, magnesium, germanium, etc. In some embodiments, the metal layer has a thickness of about 10 nanometers to about 200 nanometers. In some embodiments, the metal layer is formed by vapor deposition of a metal onto the first surface of the base layer. In some embodiments, the metal layer has a reflectivity in a range between 0.76 and 0.97 at a wavelength of 9.5 micrometers.

In some embodiments, the base layer has a thickness less than about 50 micrometers or less than about 25 micrometers.

In some embodiments, the first surface of the base layer has a specular gloss of at least 28 percent. The second surface has a roughness that is at least twice as that of the first surface.

In some embodiments, the metallized membrane has a moisture vapor transmission rate of at least 800 $g/m^2/24$ hr. In some embodiments, a combined emissivity of the metallized membrane and the outer layer is at most 0.85 at a wavelength of 9.5 micrometers.

In some embodiments, the apparatus includes the fabric. The apparatus may be one of an apparel, a footwear, a tent, or a sleeping bag.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to breathable composite fabrics for use in apparels and footwears. In one embodiment, a breathable composite fabric includes an inner layer, a metallized membrane disposed on the inner layer, and an outer layer disposed on the metallized membrane. The metallized membrane includes a base layer containing a polymer and a metal layer deposited on a first surface of the base layer. The inner layer is coupled to the metallized membrane via first point contacts, and the outer layer is coupled to the metallized membrane via second point contacts. The metal layer has a thickness of about 10 nanometers to about 200 nanometers.

Figure 1:
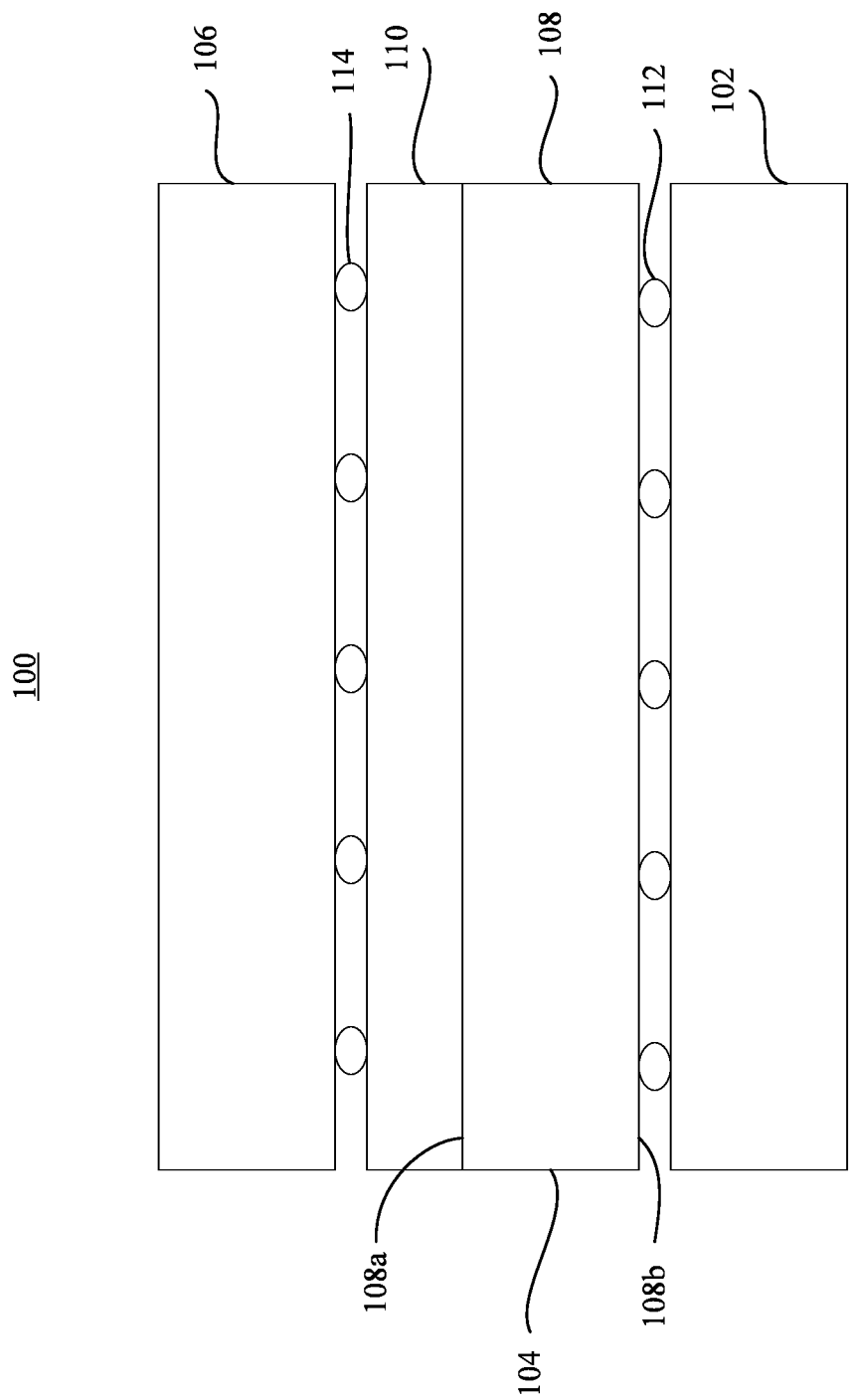
FIG. 1 is a schematic diagram depicting a breathable composite fabric, according to one example embodiment.

Embodiments will now be explained with accompanying figures. Reference is first made to FIG. 1. FIG. 1 is a schematic diagram depicting a breathable composite fabric 100 according to one example embodiment. The fabric 100 includes an inner layer 102, a metallized membrane 104 disposed on the inner layer 102, and an outer layer 106 disposed on the metallized membrane 104. The metallized membrane 104 includes a base layer 108 and a metal layer 110 deposited on a first surface 108a of the base layer 108. For example, the metal layer 110 may be formed by vapor deposition of a metal onto the first surface 108a of the base layer 108. The inner layer 102 and the metallized membrane 104 are coupled to each other via first point contacts 112. The first point contacts 112 may be arranged in a dot matrix. The first point contacts 112 connect the inner layer 102 to a second surface 108b of the base layer 108. The outer layer 106 and the metallized membrane 104 are coupled to each other via second point contacts 114. The second point contacts 114 may be arranged in a dot matrix. The second point contacts 114 connect the outer layer 106 to a surface of the metal layer 110. In the configuration illustrated in FIG. 1, the base layer 108 is sandwiched between the inner layer 102 and the metal layer 110.

Figure 2:
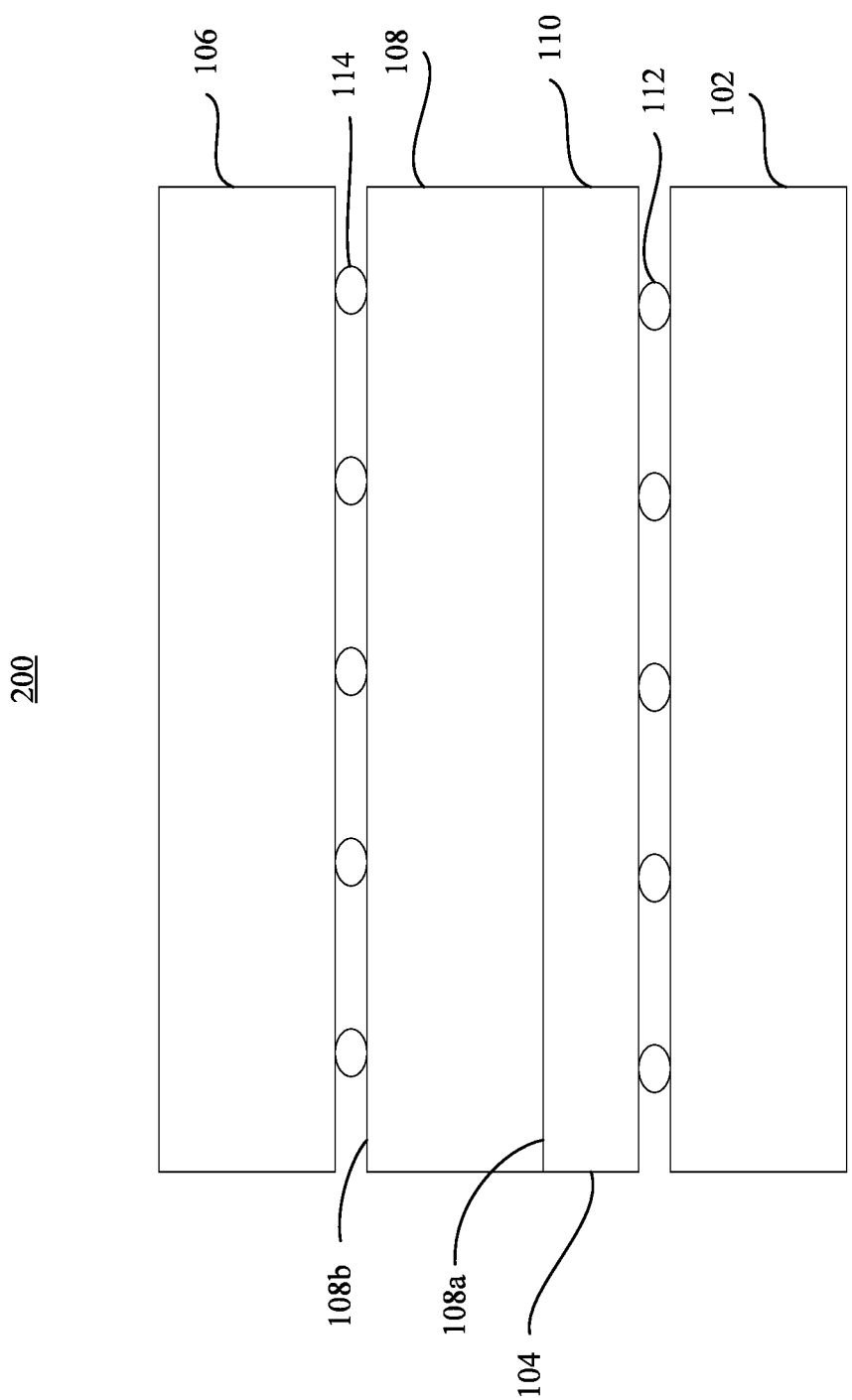
FIG. 2 is a schematic diagram depicting another breathable composite fabric, according to one example embodiment.

FIG. 2 is a schematic diagram depicting another breathable composite fabric 200 according to one example embodiment. The fabric 200 is similar to the fabric 100 with a modification where the metal layer 110 is sandwiched between the inner layer 102 and the base layer 108. In fabric 200, the first point contacts 112 connects the inner layer 102 to a surface of the metal layer 110. The second point contacts 114 connects the outer layer 106 to the second surface 108b of the base layer 108. The structure of the fabric 200 can better protect the metal layer 110 from scratches or other accidental damages during the subsequent processing and use.

The inner layer 102 is configured to add high breathability to the breathable composite fabrics 100 and 200 to make apparels and footwears that are more comfortable to wear. The inner layer 102 is also configured to be sufficiently strong, when combined with appropriate outer layer 106, to resist repeated dynamic/mechanical actions, such as wash cycles.

In some embodiments, the inner layer 102 has a moisture vapor transmission rate of at least 500 $g/m^2/24$ hr. In some embodiments, to provide further breathability the inner layer 102 has a moisture vapor transmission rate of at least 750 $g/m^2/24$ hr, at least 1000 $g/m^2/24$ hr, or at least 1500 $g/m^2/24$ hr. Including the inner layer 102 in the breathable composite fabrics 100 and 200 also provides soft touch feeling to human body, good handfeel and drape for next-to-skin application. In some embodiments, the inner layer 102 has a thickness of at least 60 micrometers to endure the wear and tear during its useful life time. Depending on where the breathable composite fabric 100 or 200 is applied to, the thickness of the inner layer 102 may vary. For example, the thickness of the inner layer 102 may be from about 60 micrometers to about 2400 micrometers, from about 60 micrometers to about 1500 micrometers, from about 60 micrometers to about 1000 micrometers, from about 60 micrometers to about 750 micrometers, or from about 60 micrometers to about 500 micrometers.

In some embodiments, the inner layer 102 includes one or more of a woven fabric, a knit fabric, or a non-woven fabric. In some embodiments, the inner layer 102 includes a synthetic material and/or a natural material. For example, the synthetic material for the inner layer 102 is selected from one or more of polyester, polyamide, polyurethane, polyolefin, polylactic acid, nylon, elastane, and PTFE. Further, the natural material for the inner layer 102 may include cotton, wool, silk, linen, and other natural fibers.

In some embodiments, the fabric 100 or 200 may have low thermal conductivity, typically not more than 0.1 W/m-K or at most 0.6 W/m-K, to minimize conductive heat loss.

In some embodiments, the inner layer 102 has a tensile strength at least 45 N/2.54 cm under ASTM (American Society of Testing Materials) D5035 test conditions, a tear strength at least 9N under ASTM 2261 test conditions, and a Mullen burst at least 350 kPa under ASTM D774 test conditions.

The metallized membrane 104 is provided as a breathable radiant barrier for insulation purposes. For those purposes, the metallized membrane 104 is configured to have low emissivity and high breathability. In some cases, the metallized membrane 104 is optionally water proof. The metallized membrane 104 may be configured to be a breathable IR reflective layer to enhance thermal insulation through radiation reflection.

In some embodiments, the metallized membrane 104 has a moisture vapor transmission rate of at least 500 $g/m^2/24$ hr. In some embodiments, to provide further breathability, the metallized membrane 104 may have a moisture vapor transmission rate of at least 800 $g/m^2/24$ hr, at least 1000 $g/m^2/24$ hr, at least 1500 $g/m^2/24$ hr, at least 2000 $g/m^2/24$ hr, or at least 2500 $g/m^2/24$ hr.

In some embodiments, the base layer 108 of the metallized membrane 104 includes a polymer. To be effective for its purposes, the base layer 108 has a thickness less than about 50 micrometers, or less than 25 micrometers, or less than about 20 micrometers, or less than about 15 micrometers, or less than about 10 micrometers. In some embodiments, the base layer 106 has an infrared transparency of at least about 40% at a wavelength of 9.5 micrometers. In some embodiments, the base layer 106 has an infrared transparency of about 40% to 60% at wavelength of 7-14 micrometers.

The first surface 108a of the base layer 108 is configured to be flat, which results in a more effective reflection layer after the base layer 108 is metallized. In some embodiments, the base layer 108 includes polyethylene, which has a lower melting point than many conventional fabric materials so that it can achieve flatter surface through calendaring at a lower temperature. In some embodiments, the base layer 108 may include one or more other materials, such as polyurethane, thermoplastic polyurethane, polyester, polyamide, ePTFE membrane, etc. In some embodiments, the base layer 108 may include an IR transparent substrate, such as polyolefin, which is beneficial because it minimally hinders the reflectivity of the metal layer 110 deposed on either side of the base layer 108. The structure of the base layer 108 is configured to maximize the thermal radiation to be reflected back to the body because minimal heat is consumed to warm up the base layer 108 due to absorption. In some embodiments, the base layer 108 may be porous.

The metal layer 110 may be formed on the base layer 108 by vapor deposition or other plating techniques. For example, metal can be deposited on the microporous base layer 108 through methods like physical vapor deposition (PVD) including sputtering, electron beam deposition, etc. The metal forms a discontinuous layer 110 to maintain breathability/porosity. In some embodiments, the metal layer 110 may include one or more of aluminum, titanium, silver, gold, copper, zinc, magnesium, germanium, etc. In some embodiments, the metal layer 110 may have a thickness of about 10 nanometers to about 200 nanometers, about 10 nanometers to about 100 nanometers, or about 10 nanometers to about 50 nanometers so as to provide pores for breathability. Other metals and thickness are contemplated so that the metal layer 110 has an emissivity of no more than 0.5 for infrared radiation at a wavelength of 9.5 micrometers.

In some embodiments, the metal layer 110 is configured to have a thickness and surface coverage to provide a reflectivity in a range between 0.76 and 0.97 at a wavelength of 9.5 micrometers determined by, for example, Fourier-transform infrared spectroscopy (FTIR). In some embodiments, the metal layer 110 has a reflectivity of 0.8 at a wavelength of 9.5 micrometers.

In one instance, each of nanoporous polyethylene and polypropylene base layers (about 40% porosity, 16-25 um thick) covered with about 100 nm aluminum can achieve a moisture vapor transmission rate of at least 2500 g/m$^2$/24 hrs. Their reflectivity at a wavelength of 9.5 micrometers is at least 0.97 on the aluminum side and at least 0.87 on the polyolefin side.

The outer layer 106 is configured to be strong, when combined with the appropriate inner layer 102, to resist repeated dynamic/mechanical actions including wet conditions such as machine washing, and dry conditions such as rubbing, crocking, and machine drying.

In some embodiments, the outer layer 106 has a moisture vapor transmission rate of at least 500 g/m$^2$/24 hr. In some embodiments, to provide further breathability the inner layer 102 has a moisture vapor transmission rate of at least 750 g/m$^2$/24 hr, at least 1000 g/m$^2$/24 hr, or at least 1500 g/m$^2$/24 hr.

In some embodiments, the outer layer 106 includes one of a woven fabric, a knit fabric, a non-woven fabric, a film or a membrane. In some embodiments, the outer layer 106 includes a synthetic material and/or a natural material. For example, the synthetic material for outer layer 106 is selected from one or more of polyester, polyamide, polyurethane, polyolefin, polylactic acid, nylon, elastane, and PTFE. Further, the natural material for outer layer 106 may include cotton, wool, silk, linen, and other natural materials.

In some embodiments, the combined emissivity of the metallized membrane 104 and the outer layer 106 may be at most 0.85. This would maintain about 45% of the thermal resistance of the metallized sheet 104 in absence of the outer layer. A suitable emissivity may be obtained by various choice of the outer layer 106. For example, when the outer layer 106 is made with a high IR transmittance material (e.g., polyolefins) and thin (e.g., less than 400 μm), the outer layer 106 may have a high cover factor (e.g., more than 90%). As used herein, a cover factor is defined as the ratio of a surface area covered by solid components such as yarns or fibers to form the outer layer 106, to the total fabric surface area. For a less/non IR-transparent material (e.g., polyester, nylon, elastane, polyurethane, polylactic acid, PTFE, cotton, wool, silk, linen etc.), the outer layer 106 may have a lower cover factor (e.g., about or below 75%) so that a portion of the metallized reflective sheet 104 is exposed. For a less/non IR-transparent material, a surface coverage of more than 90% would result in a combined emissivity being too high (>0.85) hence significantly reducing the thermal resistance achieved by the metallized sheet 104.

Table 1 below summarizes material selections of outer layers in connection with combined emissivity (metallized sheet+ outer player). Samples A-D were prepared with the same metallized sheet—an aluminized nanoporous polyolefin film having reflectivity of 0.97 on the aluminum side and 0.87 on the polyolefin side at a wavelength of 9.5 micrometers. Sample A includes an outer layer made of nonwoven polyolefin (IR transparent) having a thickness of 0.16 mm. The outer layer of sample A has a cover factor of 100%. Sample A has an acceptable combined emissivity of 0.47-0.53. Sample B is same as sample A except that sample B includes coating/finishing/printing (less than 6 g/m$^2$) on the surface of the outer layer. Sample B has an acceptable combined emissivity of 0.58-0.78. Sample C includes an outer layer made of knit of polyester fully drawn yarn (FDY) (less IR transparent). The outer layer of sample C has a thickness of 0.38 mm and has a cover factor of 67-71%. Sample C also has an acceptable combined emissivity of 0.63. Sample D includes an outer layer made of cotton (IR opaque). The outer layer of sample D has a thickness of 0.38 mm and has a cover factor of 94%. Sample D also has a failed combined emissivity of 0.89 due to the use of an IR opaque material with a high cover factor.

|  | Sample A | Sample B | Sample C | Sample D |
|---|---|---|---|---|
| Metallized sheet | Aluminized nanoporous polyolefin. Reflectivity at 9.5 um = 0.97 (aluminum side), 0.87 (polyolefin side) | | | |
| Outer layer material | Polyolefin nonwoven | Polyolefin nonwoven + <6 g/m$^2$ print | Polyester FDY knit | Cotton |
| Outer layer thickness (mm) | 0.16 | 0.16 | 0.38 | 0.38 |
| Outer layer surface coverage | 100% | 100% | 67-71% | 94% |
| Combined emissivity | 0.47-0.53 | 0.58-0.78 | 0.63 | 0.89 (failed) |

Figure 3:
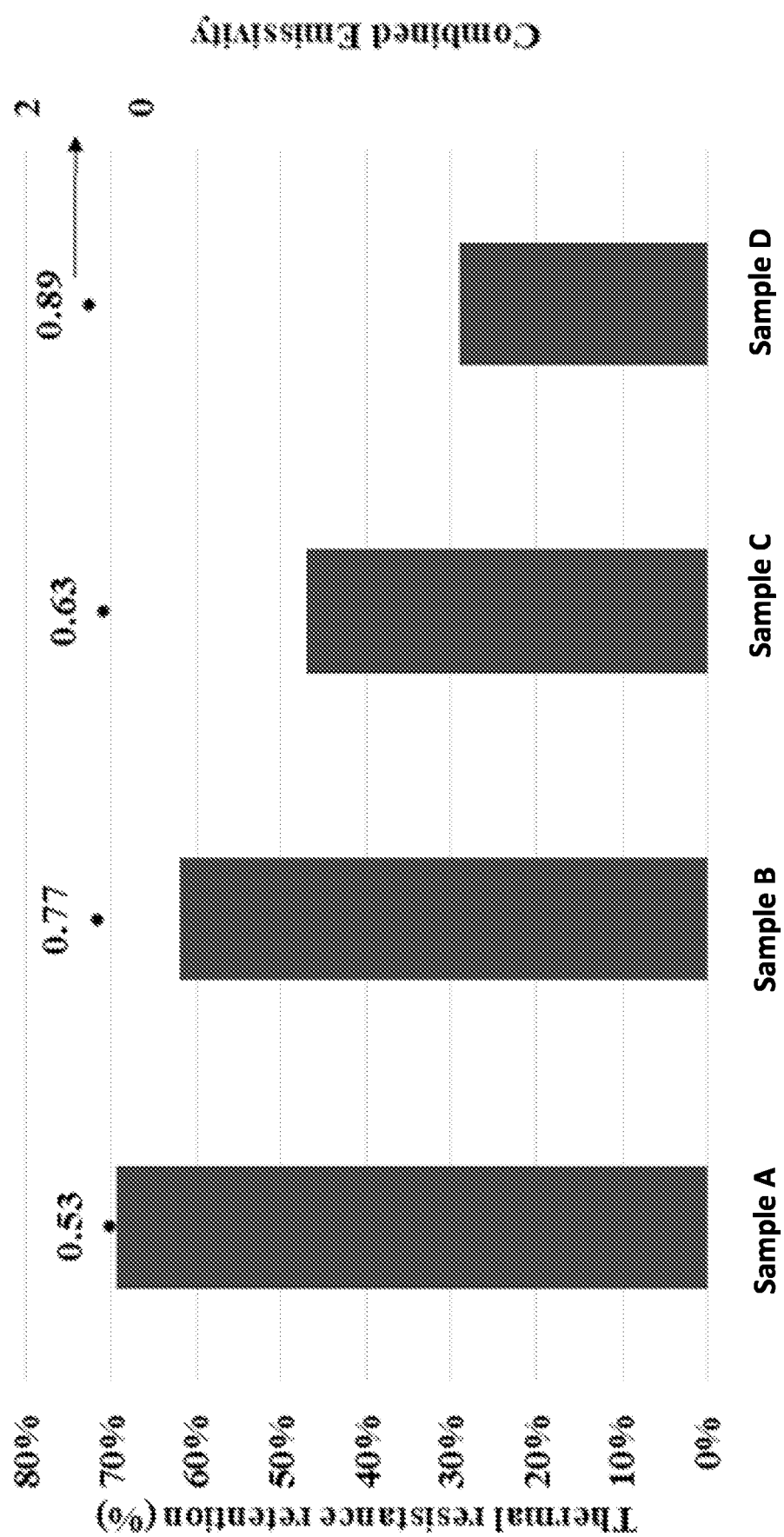
FIG. 3 is a diagram illustrating thermal resistance retention and emissivity of fabric samples, according to example embodiments.

FIG. 3 is a diagram illustrating thermal resistance retention and emissivity of samples A-D as shown in Table 1. As shown in FIG. 3, the thermal resistance retention of samples A-D is 69%, 62%, 47%, and 29%, respectively.

As shown in Table 1, the outer layer is not limited to a single component material and may have thin coating/finishing. For example, sample B includes light prints (e.g., add-on weight of <6 g/m$^2$) on a 0.16 mm polyethylene non-woven film that has a minor effect on the composite's IR reflectivity. In some embodiments, it is found that small loading (<2%) of additives such as color pigment to the IR-transparent material also has an insignificant effect on the composite's IR reflectivity. These fabrics provides more flexibility and color/pattern choices for making apparels, footwears, etc.

The inner layer 102 and the metallized membrane 104 are coupled with each other via a plurality of first point contacts 112. In some embodiments, the metallized membrane 104 can be adhered to the inner fabric through adhesives, such as water-based adhesives, solvent-based adhesives, heat-activated adhesives, or pressure-activated adhesives. The adhesives are disposed on one or both of the inner layer 102 and the metallized membrane 104 to adhere them together. The adhesives are applied in a way that does not significantly reduce the breathability of the breathable composite fabric 100 or 200. For example, this can be achieved through applying the adhesives as the first point contacts 112 in a dot matrix instead of a monolithic film.

In some embodiments, the inner layer 102 and the metallized membrane 104 may be combined through ultrasonic or laser welding. The metallized membrane 104 may also be coupled to the underlying inner layer 102 by heating the point contacts to above the melting point of the base layer 108 and/or the inner layer 102. For example, a portion of the base layer 108 may be melted to form the first point contacts 112 to connect to the inner layer 102. Or a portion of the inner layer 102 may be melted to form the first point contacts 112 to connect to the base layer 108 (FIG. 1) or the metal layer 110 (FIG. 2). In some embodiments, both a portion of the inner layer 102 and a portion of the base layer 108 may be melted to form the first point contacts 112 between the inner layer 102 and the metallized membrane 104. In some embodiments, the first point contacts 112 may be formed by sewing or quilting.

The first point contacts 112 are interposed between the inner layer 102 and the metallized membrane 104 in a manner to minimize the impact on breathability of fabric 100 or 200. For example, the first point contacts 112 has an area covering less than 80% of the inner layer 102 (or the metallized membrane 104). For improved breathability, the first point contacts 112 covers less than 50% or 40% or 30% of the inner layer 102 (or the metallized membrane 104). In one embodiment, for even better breathability, the first point contacts 112 covers less than 20% of the inner layer 102 (or the metallized membrane 104).

The first point contacts 112 interposed between the inner layer 102 and the metallized membrane 104 may be arranged in a dot matrix of any form. A density of the first point contacts 112 may be uniform across the entire breathable composite fabric 100 or 200. In some embodiments, the density of the first point contacts 112 may vary from one to another region. For example, the density of first the point contacts 112 may be increased at areas where heavy wear and tear are expected.

The outer layer 106 and the metallized membrane 104 are coupled with each other via a plurality of second point contacts 114. In some embodiments, the metallized membrane 104 can be adhered to the outer layer 106 through adhesives, such as water-based adhesives, solvent-based adhesives, heat-activated adhesives, or pressure-activated adhesives. The adhesives are disposed on one or both of the outer layer 106 and the metallized membrane 104 to adhere them together. The adhesive is applied in a manner that does not significantly reduce the breathability of the breathable composite fabric 100 or 200. For example, this can be achieved through applying the adhesives as the second point contacts 114 in a dot matrix instead of a monolithic film.

In some embodiments, the outer layer 106 and the metallized membrane 104 may be combined through ultrasonic or laser welding. The metallized membrane 104 may also be coupled to the outer layer 106 by heating the point contacts to above the melting point of the base layer 108 and/or the outer layer 106. For example, a portion of the base layer 108 may be melted to form the second point contacts 114 to connect to the outer layer 106. Or a portion of the outer layer 106 may be melted to form the second point contacts 114 to connect to the metal layer 110 (FIG. 1) or the base layer 108 (FIG. 2). In some embodiments, both a portion of the outer layer 106 and a portion of the base layer 108 may be melted to form the second point contacts 114 between the outer layer 106 and the metallized membrane 104 (FIG. 2). In some embodiments, the second point contacts 114 may be formed by sewing or quilting.

The second point contacts 114 are interposed between the outer layer 106 and the metallized membrane 104 in a manner to minimize the impact on breathability of fabric 100 or 200. For example, the second point contacts 114 has an area covering less than 80% of the outer layer 106 (or the metallized membrane 104). For improved breathability, the second point contacts 114 covers less than 50% or 40% or 30% of the outer layer 106 (or the metallized membrane 104). In one embodiment, for even better breathability, the second point contacts 114 covers less than 20% of the outer layer 106 (or the metallized membrane 104).

The second point contacts 114 interposed between the outer layer 106 and the metallized membrane 104 may be arranged in a dot matrix of any form. A density of the second point contacts 114 may be uniform across the entire breathable composite fabric 100 or 200. In some embodiments, the density of the second point contacts 114 may vary from one to another region. For example, the density of the second point contacts 114 may be increased at areas where heavy wear and tear are expected.

In some embodiments, the breathable composite fabric 100 or 200 has breathability (MVTR) of at least 70% of its components including the inner layer 102, the metallized membrane 104, and the outer layer 106.

In some embodiments, the configuration of the breathable composite fabric 100 or 200 exposes the metallized membrane 104 (reflective layer) so that it does not block out the fabric's reflectivity on the outer layer side.

In some embodiments, when the point contacts 112, 114 are embodied with adhesive, the adhesive adds a weight fewer than 30 or 60 g/m$^2$.

Figure 4A:
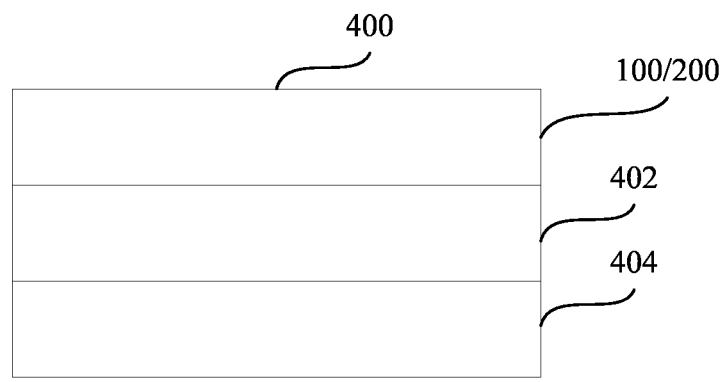
FIG. 4A-4C are schematic diagrams depicting laminates, according to example embodiments.
Figure 4B:
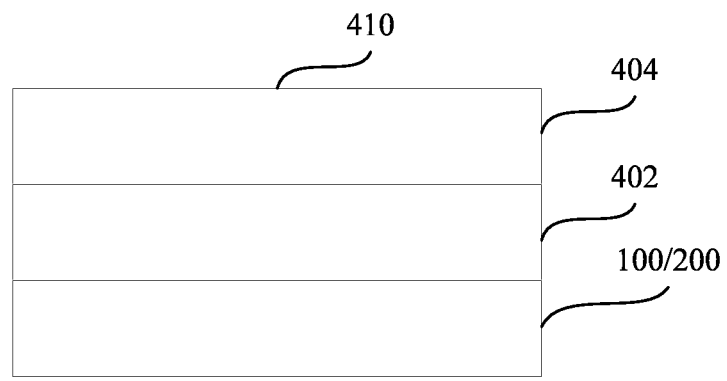
Figure 4C:
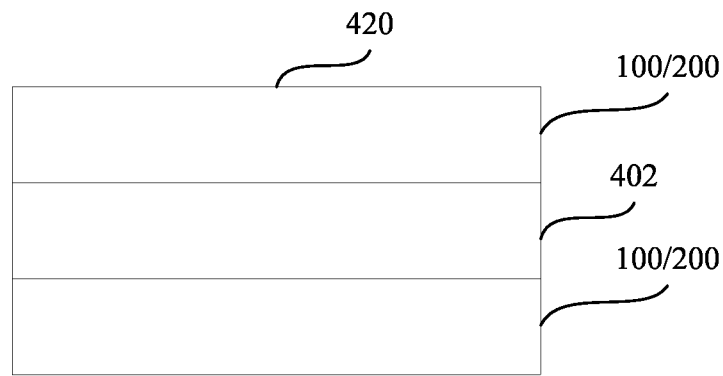

In some embodiments, the breathable composite fabric 100/200 may be used to make apparels, footwears, tents, sleeping bags, etc. In some embodiments, the breathable composite fabric 100/200 may be used with other materials to make apparels, footwears, tents, sleeping bags, etc. Example configurations are illustrated in FIGS. 4A-4C. FIG. 4A is a schematic diagram depicting a laminate 400 according to one example embodiment. The laminate 400 includes an outer layer made of the breathable composite fabric 100/200, an intermediate fibrous layer 402, and a single-layered fibric 404. In some embodiments, the intermediate fibrous layer 402 may include a fibrous insulation material, such as synthetic insulation, down, etc.

FIG. 4B is a schematic diagram depicting a laminate 410 according to one example embodiment. The laminate 410 includes an outer layer made of a single-layered fibric 404, an intermediate fibrous layer 402, and an inner layer made of the breathable composite fabric 100/200.

FIG. 4C is a schematic diagram depicting a laminate 420 according to one example embodiment. The laminate 420 includes an outer layer made of breathable composite fabric 100/200, an intermediate fibrous layer 402, and an inner layer made of the breathable composite fabric 100/200. It is to be understood that laminates 400, 410 and 420 are for illustration purpose only. Other structures using the breathable composite fabric 100/200 are contemplated.

This disclosure also provides an infrared-reflective breathable composite fabric that offers enhanced thermal insulation through infrared reflection. A three-layer composite where the middle layer is a breathable metallized layer mainly responsible for infrared reflection; while the inner and outer layers both provide strength and support so that the metallized layer can resist mechanical actions such as repeated rubbing and laundering. Further, the outer layer is chosen so that it not only protects the metallized layer from oxidation, hence avoiding the reduction in reflectivity, but also not to block off the fabric's outward-facing emissivity. An emissivity of at most 0.8 is demonstrated in providing effective warming performance (measured by thermal resistance) through IR reflection. The inner layer is also selected for giving a nice next-to-skin handfeel.

In one aspect, a breathable composite fabric disclosed herein has high breathability, which makes it more comfortable to be worn than garment made from non-porous reflective foil.

In another aspect, a breathable composite fabric disclosed herein includes a more effective reflection layer using a metallized membrane. The metallized membrane includes a base layer made of polyethylene, which has a lower melting point than many conventional fabric material so that it can achieve flatter surface through calendaring at a lower temperature, e.g., less than 200° C. or about 135° C.

In yet another aspect, a breathable composite fabric disclosed herein includes a base layer of polyethylene having a thin thickness of about 200 micrometers or less, making it fairly transparent (about 40-60%) to infra-red radiation from human body (wavelength about 7-14 micrometers). The breathable composite fabric thus maximizes thermal radiation to be reflected back to the body because minimal heat is consumed to warm up the layers due to absorption.

In another aspect, a breathable composite fabric disclosed herein provide better structural integrity and anti-oxidation ability than that of other meltspun non-woven materials, making the breathable composite fabric less susceptible to disintegration after washing.

In another aspect, a breathable composite fabric disclosed herein includes point contacts for adhering an inner layer and an outer layer to a metallized membrane, resulting in high breathability that is desirable for applications in apparels, footwears, tents, and sleeping bags, or other applications that need fabric materials.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A metallized breathable composite fabric for apparel comprising:
   an innermost fabric layer comprising a woven fabric, a knit fabric, or a non-woven fabric, the innermost fabric layer comprising a first inner surface and a first outer surface, the innermost fabric layer having a moisture vapor transmission rate of at least 500 g/m$^2$/24 hr;
   a metallized membrane comprising:
      a second inner surface coupled to the first outer surface of the inner layer via first point contacts; and
      a second outer surface;
   the metallized membrane including a base layer containing a nanoporous polyolefin film, the base layer comprising the second inner surface and a third outer surface, wherein the base layer has a thickness of less than 50 microns, an infrared transparency of at least about 40% at a wavelength of approximately 9.5 microns, and a moisture vapor transmission rate of at least 500 g/m$^2$/24 hr, the nanoporous polyolefin film having a reflectivity of at least 0.87 at a wavelength of approximately 9.5 microns,
   the metallized membrane including a metal layer, the metal layer comprising the second outer surface and a third inner surface, the third inner surface coupled to the third outer surface of the base layer, wherein the metal layer has a reflectivity of at least 0.76 at a wavelength of approximately 9.5 microns and a moisture vapor transmission rate of at least 500 g/m$^2$/24 hr; and
   an outermost fabric layer comprising a knit of polyester fully drawn yarn (FDY), the outermost fabric layer having a cover factor of between 67 percent and 71 percent, the outermost fabric layer comprising a fourth outer surface and a fourth inner surface, the fourth inner surface coupled to the second outer surface of the metal layer of the metallized membrane via second point contacts, the outermost fabric layer having a moisture vapor transmission rate of at least 500 g/m$^2$/24 hr.

2. The fabric according to claim 1, wherein the fabric has a thermal conductivity at most 0.6 W/m-K.

3. The fabric according to claim 1, wherein the inner layer includes a synthetic material or a natural material.

4. The fabric according to claim 3, wherein the synthetic material is selected from one or more of polyester, nylon, elastane, polyurethane, polyolefin, polylactic acid, or polytetrafluoroethylene (PTFE).

5. The fabric according to claim 1, wherein the fabric has a moisture vapor transmission rate at least 70% of each of the inner layer, the metallized membrane, and the outer layer.

6. The fabric according to claim 1, wherein the first and second point contacts include an adhesive.

7. The fabric according to claim 1, wherein the first and second point contacts include a melted base layer, a melted inner layer, or a melted outer layer.

8. The fabric according to claim 1, wherein the first point contacts or the second point contacts are formed by sewing or quilting.

9. The fabric according to claim 1, wherein the metal layer comprises one or more of aluminum, titanium, silver, gold, copper, zinc, magnesium, or germanium.

10. The fabric according to claim 1, wherein the metal layer has a thickness of about 10 nanometers to about 200 nanometers.

11. The fabric according to claim 1, wherein the nanoporous polyolefin has a thickness of 16 to 25 microns and has approximately 40 percent porosity, and the metal layer has a thickness of approximately 100 nm.

* * * * *